United States Patent
Nordstrand et al.

(10) Patent No.: US 8,925,315 B2
(45) Date of Patent: Jan. 6, 2015

(54) METHOD AND APPARATUS FOR VARIABLE VALVE ACTUATION

(75) Inventors: Andreas Nordstrand, Eskilstuna (SE); Lennarth Zander, Stockholm (SE)

(73) Assignee: Volvo Lastvagnar AB, Göteborg (SE)

( * ) Notice: Subject to any disclaimer, the term of this patent is extended or adjusted under 35 U.S.C. 154(b) by 74 days.

(21) Appl. No.: 13/145,798

(22) PCT Filed: Jan. 22, 2009

(86) PCT No.: PCT/SE2009/000026
§ 371 (c)(1),
(2), (4) Date: Oct. 6, 2011

(87) PCT Pub. No.: WO2010/085181
PCT Pub. Date: Jul. 29, 2010

(65) Prior Publication Data
US 2012/0102945 A1 May 3, 2012

(51) Int. Cl.
| | | |
|---|---|---|
| F02B 33/44 | (2006.01) | |
| F02B 47/08 | (2006.01) | |
| F02P 13/00 | (2006.01) | |
| F02D 13/02 | (2006.01) | |
| F01L 1/18 | (2006.01) | |
| F01L 13/00 | (2006.01) | |
| F02D 41/00 | (2006.01) | |
| F02D 41/10 | (2006.01) | |

(52) U.S. Cl.
CPC ............. *F02D 13/0265* (2013.01); *F01L 1/181* (2013.01); *F01L 13/0015* (2013.01); *F01L 13/0036* (2013.01); *F02D 41/0007* (2013.01); *F02D 41/0055* (2013.01); *F02D 41/10* (2013.01); *F02D 2041/001* (2013.01); *Y02T 10/144* (2013.01); *Y02T 10/47* (2013.01); *Y02T 10/18* (2013.01)
USPC ........ 60/605.2; 60/611; 123/568.11; 123/150

(58) Field of Classification Search
CPC ......... F01L 1/00; F01L 13/00; F01L 13/0015; F02D 13/00; F02D 41/00; F02D 41/10; F02D 17/00
USPC .............. 60/600–603, 605.2, 611; 123/90.16, 123/316, 347
See application file for complete search history.

(56) References Cited

U.S. PATENT DOCUMENTS 4,708,101 A * 11/1987 Hara et al. ................. 123/90.16
6,178,749 B1 * 1/2001 Kolmanovsky et al. ..... 60/605.2
(Continued)

FOREIGN PATENT DOCUMENTS

DE   4404683 C1   3/1995
DE   10232942 C1  2/2004
(Continued)

OTHER PUBLICATIONS

Supplementary European Search Report (Oct. 24, 2012) for corresponding European App. EP 09 83 8961.
(Continued)

*Primary Examiner* — Kenneth Bomberg
*Assistant Examiner* — Deming Wan
(74) *Attorney, Agent, or Firm* — WRB-IP LLP

(57) ABSTRACT

A method for reducing turbolag in a turbocharged internal combustion engine includes demanding torque for shifting the internal combustion engine from a stationary engine mode to a transient engine mode, closing an exhaust gas recirculation (EGR) valve during the transient engine mode, repositioning guide vanes of a Variable Geometry Turbine (VGT) turbo unit from a first position when in the stationary engine mode to a second position when in the transient engine mode, increasing a duration of overlapping of at least one inlet valve and at least one outlet valve provided in a cylinder head of the internal combustion engine from as first duration when in the stationary mode to a second duration when in the transient mode for increasing the amount of air flowing from an inlet manifold to an exhaust manifold and thereby increasing acceleration of a turbine of the VGT turbo unit.

11 Claims, 8 Drawing Sheets

(56) References Cited

U.S. PATENT DOCUMENTS

| | | | |
|---|---|---|---|
| 6,837,199 B2 * | 1/2005 | Matsuura et al. | 123/90.16 |
| 8,065,988 B2 * | 11/2011 | Hatamura | 123/347 |
| 2002/0013653 A1 | 1/2002 | Ohyama et al. | |
| 2003/0209228 A1 | 11/2003 | Miura | |
| 2004/0099244 A1 | 5/2004 | Matsuura et al. | |
| 2004/0182372 A1 | 9/2004 | Kennedy | |
| 2006/0005796 A1 | 1/2006 | Janak et al. | |
| 2006/0236969 A1 | 10/2006 | Falkowski et al. | |
| 2006/0278196 A1 | 12/2006 | Beer et al. | |
| 2006/0288701 A1 | 12/2006 | Ramamurthy et al. | |
| 2008/0077304 A1 * | 3/2008 | Suzuki et al. | 701/102 |

FOREIGN PATENT DOCUMENTS

| | | |
|---|---|---|
| EP | 1024261 A2 | 8/2000 |
| EP | 1736639 A2 | 12/2006 |
| GB | 2200967 A | 8/1988 |
| WO | 2005035958 A1 | 4/2005 |

OTHER PUBLICATIONS

JP2004245104 A (Mitsubishi Motors Corp) Sep. 2, 2004 {Sep. 2, 2004} * abstract *.

International Search Report for corresponding International Application PCT/SE2009/000026.

* cited by examiner

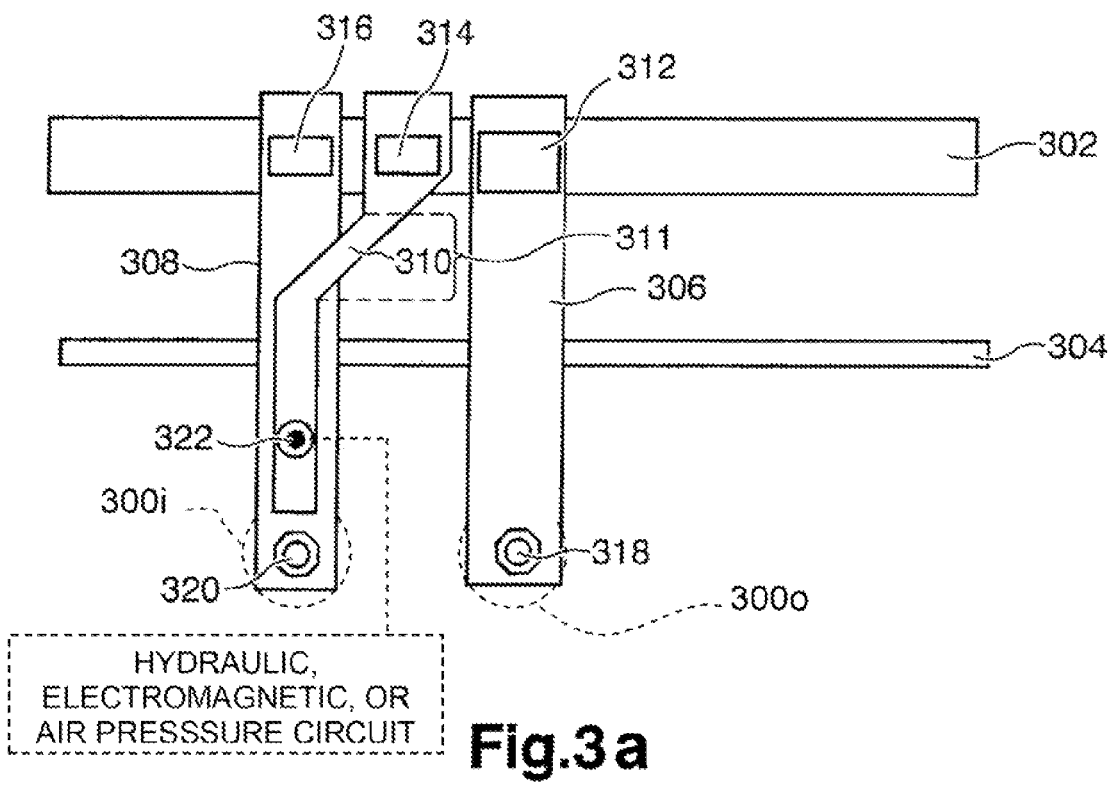

METHOD AND APPARATUS FOR VARIABLE VALVE ACTUATION

BACKGROUND AND SUMMARY

The present invention relates to a method and an apparatus for an internal combustion engine.

Turbochargers are well known and widely used with combustion engines for purpose of increasing power output, decreasing fuel consumption and emissions, and compensating for air density loss at high altitudes. Generally, turbochargers supply an increased charge air supply for the combustion process than can otherwise be induced through natural aspiration by utilizing exhaust gas energy to drive an air compressor. This increased air supply allows more fuel to be burned, thereby increasing power and output not otherwise obtainable from an engine having a given cylinder displacement under natural aspiration conditions. Variable geometry turbochargers (VGTs) allow the intake airflow to be optimized over a range of engine speeds. This may be accomplished by changing the angle of the inlet guide vanes on the turbine stator. An optimal position for the inlet guide vanes is determined from a combination of desired torque response, fuel economy, and emission requirement.

EGR systems are used to reduce NOx emissions by—increasing the dilution fraction in the intake manifold. EGR is typically accomplished with an EGR valve that connects the intake manifold with the exhaust manifold.

In the cylinders, the recirculated exhaust gas acts as an inert gas, thus lowering the flame and in-cylinder gas temperature and, hence, decreasing the formation of NOx. On the other hand, the recirculated exhaust gas displaces fresh air and reduces the air-to-fuel ratio of the in-cylinder mixture.

At medium to high engine speeds, there is an abundance of energy in the engine exhaust gas stream and, over this operating speed range, the turbocharger is capable of supplying the engine cylinders with all the air needed for efficient combustion and maximum power and torque output for a given engine construction. In certain applications, however, an exhaust stream waste gate, i.e., vent, is needed to bleed off excess energy in the engine exhaust stream before it enters the turbocharger turbine to prevent the engine from being overcharged. Typically, the waste gate is set to open at a pressure below which undesirable predetonation or an unacceptable high internal engine cylinder pressure is generated.

A particular problem with turbocharged diesel engines is poor acceleration, particularly from idle or low engine speeds. This "turbo-lag" is due to the time delay associated with filling the intake manifold with enough fresh air to support the amount of fuel required to satisfy the operator's torque demand. To meet this requirement, however, the delivered fuel often must be limited as a function of the available air in order to maintain the air-to fuel ratio above the threshold at which visible smoke occurs. The rate at which the air supply can be increased is limited by the dynamics of the turbocharger and the transport delay between the turbocharger compressor and the intake manifold of the engine.

To improve acceleration, some engine control systems use a transient detection feature to turn off the feedback control to the EGR and close the EGR valve when fuel limiting is active. This is done to provide as much fresh air as possible to the intake manifold so that the maximum amount of fuel can be injected without violating the air/fuel threshold at which visible smoke occurs.

There is still a need for an improved internal combustion engine system which improves engine performance, low-speed engine response and reduced emission characteristics of a conventional internal combustion engine and an improved turbo charging system for controlling and optimizing turbocharged engine performance.

It is desirable to overcome the problems of prior systems and to provide an improved internal combustion engine and turbo charging system for improved engine performance at least at transient conditions.

According to a first aspect of the invention it is provided a method for reducing turbolag in a turbocharged internal combustion engine comprising an inlet manifold, an exhaust manifold, an exhaust gas recirculation (EGR) valve and a Variable Geometry Turbine (VGT) turbo unit.

Said method comprising the steps of demanding torque for shifting the internal combustion engine from a stationary engine mode to a transient engine mode; closing the EGR valve at a positive pressure difference during said transient engine mode; repositioning guide vanes of the VGT turbo unit from a first position when in said stationary engine mode to a second position at said positive pressure difference during said transient engine mode; increasing a duration of overlapping of at least one inlet valve and at least one outlet valve provided in a cylinder head of said internal combustion engine from a first duration when in said stationary engine mode to a second duration at said positive pressure difference during said transient engine mode for increasing the amount of air flowing from the inlet manifold to the exhaust manifold and thereby increasing acceleration of a turbine of said VGT turbo unit.

An advantage of this embodiment of the present invention is a better response, particularly for a diesel engine with VGT turbo used in a wheel loader.

In another example embodiment of the present invention said increasing of duration of at least one inlet valve and at least one outlet valve comprising the steps of providing a first cam lobe on a rotatable camshaft for interacting with a main rocker arm serving to transmit the movement of said first cam lobe to a first inlet valve; providing at least one second cam lobe spaced apart from said first cam lobe, where said second cam lobe is actable on a secondary rocker arm servable to transmit the movement of said second cam lobe to said first inlet valve during each revolution of the camshaft; switching said secondary rocker arm between at least two different working positions.

An advantage of this embodiment of the present invention is that it is a compact and requires very little space.

Another advantage of this embodiment is that said switching may be performed dynamically during the use of the internal combustion engine, which means that the overlap of the inlet and outlet valves may be varied at any time on demand.

In another example embodiment of the present invention said at least second cam lobe is provided laterally spaced apart from said first cam lobe on said rotatable camshaft.

An advantage of this embodiment is that a single camshaft may be used with no or very little design changes compared to a standard camshaft for the same engine.

In another example embodiment of the present invention said second cam lobe is provided on a second camshaft and said first cam lobe is provided on a first camshaft.

An advantage of this embodiment is that it may give a greater freedom of design alternatives than using a single camshaft regarding the design of the cam lobes, positioning of the cam lobes and the design of the valve train.

In another example embodiment of the present invention said second cam lobe is asymmetrical.

In still another example embodiment of the present invention said method further comprising the step of: switching said secondary rocker arm between at least two different positions with a hydraulic circuit comprising a fluid source, a hydraulic piston, which is displaceable in a hydraulic cylinder.

An advantage of this embodiment of the present invention is that an available hydraulic pressure may be used for said switching of said secondary rocker arm between said at least two different positions.

In still another example embodiment of the present invention said method further comprising the step of: switching said secondary rocker arm between at least two different positions with an electromagnetic circuit comprising an electromagnetic source and a piston displaceable in a cylinder, where said piston is movable by means of applying an electromagnetic field.

An advantage of this embodiment of the present invention is that the switching may be very quick and that the electromagnetic circuit may require very little space.

In still another example embodiment of the present invention said method further comprising the step of: switching said secondary rocker arm between at least two different positions with an air pressure circuit comprising an air pressure source and a piston displaceable in a cylinder, where said piston is movable by means of applying an air pressure.

An advantage of this embodiment of the present invention is that an available air pressure may be used for said switching of said secondary rocker arm between said at least two different positions.

According to another aspect of the present invention it is provided a computer readable memory comprising a program code for performing the method for reducing turbolag in a turbocharged internal combustion engine.

According to still another aspect of the present invention it is provided a vehicle comprising the computer readable memory comprising a program code for performing the method for reducing turbolag in a turbocharged internal combustion engine.

According to yet another aspect of the present invention it is provided an apparatus for reducing turbolag in a turbocharged internal combustion engine comprising an inlet manifold, an exhaust manifold, an exhaust gas recirculation (EGR) valve and a Variable Geometry Turbine (VGT) turbo unit. Said apparatus comprising: means for demanding torque for shifting the internal combustion engine from a stationary engine mode to a transient engine mode; means for closing the EGR valve at a positive pressure difference during said transient engine mode; means for repositioning guide vanes of the VGT turbo unit from a first position when in said stationary engine mode to a second position at said positive pressure difference during said transient engine mode; means for increasing a duration of overlapping of at least one inlet valve and at least one outlet valve provided in a cylinder head of said internal combustion engine from a first duration when in said stationary engine mode to a second duration at said positive pressure difference during said transient engine mode for increasing the amount of air flowing from the inlet manifold to the exhaust manifold and thereby increasing acceleration of a turbine of said VGT turbo unit.

BRIEF DESCRIPTION OF THE DRAWINGS

The present invention together with the above mentioned and other objects and advantages may best be understood from the following detailed description of the embodiments, but not restricted to the embodiments, wherein is shown schematically:

FIG. 3a depicts in view from above a first example embodiment of valve mechanism for accomplishing the present invention

DETAILED DESCRIPTION

Figure 1:
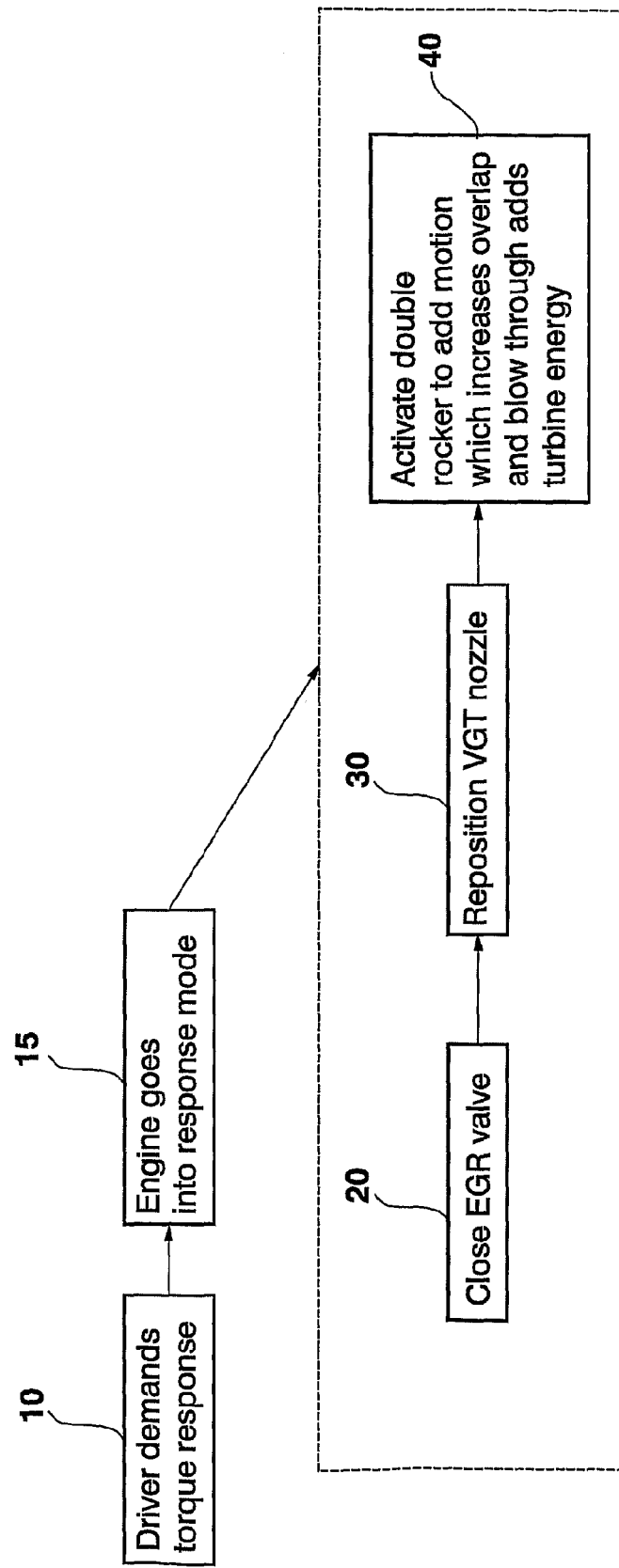
FIG. 1 is a schematic example embodiment of a flow chart for reducing turbolag according to the present invention.
Figure 6:
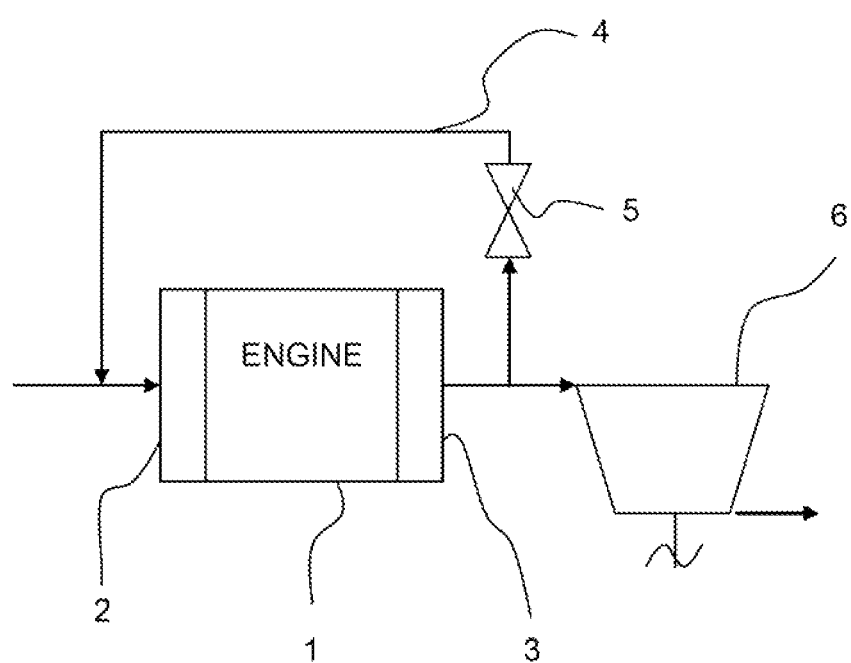
FIG. 6 schematically shows an EGR line between an outlet and an inlet manifold.

FIG. 1 illustrates schematically a flowchart of an example embodiment of a method for reducing turbolag in a turbocharged internal combustion engine. As seen in FIG. 6, the engine 1 comprises an inlet manifold 2, an exhaust manifold 3, an exhaust gas recirculation (EGR) line 4 between the exhaust manifold and the inlet manifold and including an EGR valve 5 and a Variable Geometry Turbine (VGT) turbo unit 6.

Said method for reducing turbolag comprising a first step 10 of demanding torque for shifting the internal combustion engine from a stationary engine mode to a transient engine mode. The demanding of torque may be performed by depressing an accelerator pedal by the driver. When the driver demands torque by depressing the accelerator pedal the engine goes into a response mode or a transient engine mode 15.

The transient engine mode may be characterized by a higher boost pressure than the exhaust pressure, i.e., the pressure upstream an inlet valve of the internal combustion engine is higher than the pressure downstream an outlet valve of the same internal combustion engine (positive pressure difference).

A stationary engine mode may be characterized by an engine running at an rpm and torque that is not changed over time.

When going into no torque demand (releasing the accelerator pedal) it may be favorable to try and maintain turbo speed. The turbo speed may be maintained during no torque demand by managing VGT vanes. In many cases engine braking is wanted if accelerator pedal is released and therefore an engine brake mode may be activated, which means in a case of no engine brake that fuel injection is set to 0 mg/str.

In a second step 20 the EGR valve is fully closed during said positive pressure difference.

In a third step 30 the guide vanes of the VGT turbo unit is repositioned from a first position when said internal combustion engine is in said stationary engine mode to a second position when said internal combustion engine has a positive pressure difference. Said second position is characterized by a greater flow of exhaust gases than said first position, i.e., the guide vanes in the VGT is opened up when the engine has a positive pressure difference compared to when said engine is in said stationary mode. This repositioning of the guide vanes is performed for ensuring a positive pressure difference. The repositioning of the guide vanes also increases the efficiency, of the turbine since the pressure on the exhaust side is decreased which in turn will result in a turbine speeding up more quickly.

The positioning of the guide vanes is dependent on mass flow, turbo speed and pressure balance over the engine. These set of parameters may be stored in a control unit and compared with factual measured values in order to set the guide vanes to an optimal position.

The means for repositioning guide vanes of the VGT turbo unit from a first position when in said stationary engine mode to a second position when in said transient engine mode may for instance be an electric motor, oil pressure, gas pressure or similar means.

In a fourth step 40 a duration of overlapping of at least one inlet valve and at least one outlet valve provided in a cylinder head of said internal combustion engine is increased from a first duration when in said stationary mode to a second duration when in said transient mode for increasing the amount of air flowing from the inlet manifold to the exhaust manifold and thereby increasing acceleration of a turbine of said VGT turbo unit. Exemplified means for accomplishing the increased overlap during said circumstances is described in connection with FIG. 3-5.

In another example embodiment said method further comprising a step of providing a first cam lobe on a rotatable camshaft for interacting with a first main rocker arm serving to transmit the movement of said first cam lobe to a first inlet valve, and another step of providing at least one second cam lobe spaced apart from said first cam lobe, where said second cam lobe is actable on a secondary rocker arm servable to transmit the movement of said second cam lobe to said first inlet valve during each revolution of the camshaft, and still another step of switching said secondary rocker arm between at least two different working positions.

The second cam lobe is in this example embodiment arranged spaced apart from said first cam lobe, which means that said second cam lobe could be arranged at another axial distance on the same camshaft compared to the first cam lobe. Another possibility is that the second cam lobe is arranged at the same axial position on the camshaft as the first cam lobe but rotated x number of degrees from the first cam lobe, where x for example may be 70-250 degrees. Yet another possibility is that the second cam lobe is arranged on another camshaft.

In another example embodiment said second cam lobe may be asymmetrical. In still another example embodiment said first and second cam lobes are identical. In yet another example embodiment said first cam lobe may have a different symmetry and/or lift height compared to the second cam lobe.

The switching of said secondary rocker arm between at least two different positions may be performed with a hydraulic circuit as shown schematically by dotted lines in FIG. 3a comprising a fluid source, a hydraulic piston, which is displaceable in a hydraulic cylinder. This is well known in the art and one example embodiment is illustrated in U.S. Pat. No. 5,890,469.

The switching said secondary rocker arm between at least two different positions may be performed with an electromagnetic circuit as shown schematically by dotted lines in FIG. 3a comprising an electromagnetic source and a piston displaceable in a cylinder, where said piston is movable by means of applying an electromagnetic field. This is well known in the art and therefore need no further explanation in this context.

The switching said secondary rocker arm between at least two different positions may be performed with an air pressure circuit as shown schematically by dotted lines in FIG. 3a comprising an air pressure source and a piston displaceable in a cylinder, where said piston is movable by means of applying an air pressure. This may be achieved by similar means as disclosed in U.S. Pat. No. 5,890,469.

A computer readable memory may comprise a program code for performing the method for reducing turbolag as disclosed above. Said computer readable memory may be provided in a vehicle, boat, a stationary unit etc.

Figure 2:
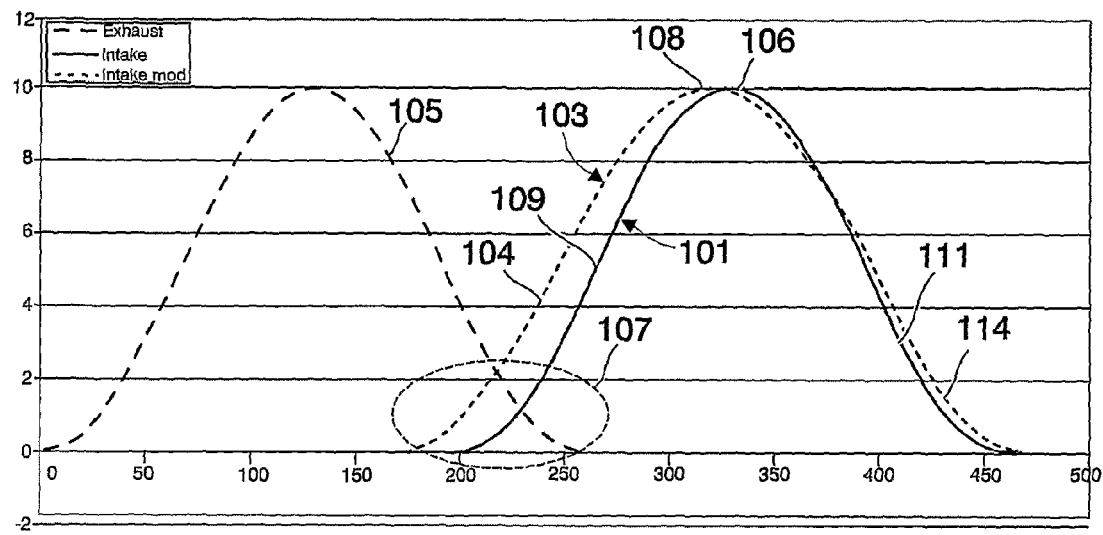
FIG. 2 is an example embodiment of a curve diagram with cam lift as a function of cam rotation according to the present invention.

FIG. 2 represents a cam curve diagram representing an example embodiment of the present invention wherein the X-axis gives the cam rotational degrees and the Y-axis the cam lift height. A solid line represents a standard cam curve 101 for an inlet valve. A dashed line represents a standard cam curve 105 for an outlet valve. A dotted line 103 represents a reduced turbolag cam curve.

The standard cam curve 101 has a positive flank 107 and a negative flank 111 which positive flank 107 and negative flank 111 are divided by a standard cam peak point 106. The reduced turbolag cam curve 103 has a positive flank 104 and a negative flank 114, which positive flank 104 and negative flank 114 are divided by a reduced turbolag cam curve peak point 108. In FIG. 2 said reduced turbolag cam curve peak point 108 is overlapping with the standard cam peak point 106. Said overlapping is advantageous since there is none or very little acceleration and speed of the inlet valve at this point. However it may very well be possible to start the standard cam curve 101 at another point along the negative flank 114 of the reduced turbolag cam curve 101, but in such situations there may be very strong forces acting on the valve mechanism for the Standard inlet valve actions, which may cause undesirable wear.

In FIG. 2 it is also clear that the slope of the positive flank 107 of the standard cam curve 101 resembles the positive flank 103 of the reduced turbolag cam curve 114. The same applies to the negative flank 111 of the standard cam curve 101 which resembles the negative flank 114 of the reduced turbolag cam curve 103. The reduced turbolag cam curve 103 may have a longer or a shorter duration compared to the standard cam curve 101.

An overlapping area 107 of the inlet valve and the exhaust valve is increased by activating the reduced turbolag cam curve according to FIG. 2 compared to if the standard cam curve 101 is used. The increased overlap, in time, which is only activated during transient engine modes, enhances the response of the engine, i.e. the speed of the turbine wheel and thereby a boost pressure will be built up quicker. Han EGR (Exhaust gas recirculation) system is provided on the engine and EGR valve is closed during said transient engine mode. A turbo unit provided with variable geometry, i.e., guide blades which may be positioned for increasing or decreasing the flow of exhaust gases through the turbine wheel, may be repositioned from a first position when the engine is in a stationary mode to a second position when the engine is in said transient mode.

FIG. 3a illustrates schematically an example embodiment of a valve mechanism 300 according to the present invention. The valve mechanism comprising a camshaft 302, a rocker arm shaft 304, an outlet rocker arm 306, a main inlet rocker arm 308, and a secondary inlet rocker arm 310. The main inlet rocker arm 308 and the outlet rocker arm 306 are pivotally supported on said rocker arm shaft 304.

The outlet rocker arm 306 is on one side of the rocker arm shaft 304 provided with a valve depressor 318, and on the other side an exhaust rocker arm roller 312, which interacts with a rotatable camshaft 302 having a cam lobe for the exhaust or outlet valve 300o, shown via dotted lines in FIG. 3a. In the following description the outlet rocker arm is supposed to be design as mentioned above, i.e., a traditional rocker arm shall without any extra features. However, the concept with a main and a secondary rocker arm actuated by two separate cam lobes provided spaced apart to be described herein below in connection with the inlet valve 300i, shown via dotted lines in FIG. 3a, and its mechanism may very well be applied to the outlet valve mechanism, for instance as means for engine braking. The meaning of two separate cam lobes provided spaced apart from each other is that said cam lobes could be provided laterally and/or angularly spaced apart from each other on a single camshaft or one cam lobe on a first cam shaft and a second cam lobe on a second cam shaft.

The main inlet rocker arm 308 is on one side of the rocker arm shaft 304 provided with a valve depressor 320, and on the other side a main inlet rocker arm roller 316, which interacts with a first cam lobe for the inlet valve provided on said rotatable camshaft 302. The main inlet rocker arm 308 is furthermore provided with a secondary inlet rocker arm 310, which may either be pivotally supported on the main rocker arm 308 (see FIG. 4) or pivotally supported by the rocker arm shaft 304 (see FIG. 5).

The secondary inlet rocker arm 310 is on one side of a pivot shaft (being either the rocker arm shaft or a separate shaft which could be arranged in the main rocker arm) provided with a control valve 322, and on the other side a secondary inlet rocker arm roller 314, which is interactable with a second cam lobe for the inlet valve on said rotatable camshaft 302.

In a first example embodiment said first and second cam lobes for the inlet valve and said cam lobe for the exhaust valve are arranged on a single camshaft, where said second cam lobe for the inlet valve is laterally separated from both said cam lobe for the exhaust valve and the first cam lobe for the inlet valve on said cam shaft. In the illustrated example embodiment in FIG. 3a, said second cam lobe for the inlet valve is arranged between the cam lobe for the outlet valve and the first cam lobe for the inlet valve. Said second cam lobe for the inlet valve may also be arranged at the side of both said first cam lobe for the inlet valve and the cam lobe for the exhaust valve, to the right or left respectively.

The second cam lobe for the inlet valve has a positive flank which may be interactable with the secondary inlet rocker arm roller 314, which means that the main inlet rocker arm roller 316 may come into contact with the positive flank of the second cam lobe for the inlet valve, once the secondary inlet rocker arm roller 314 for the inlet valve has reached its maximum lift and is in descending motion, with low relative speed at point 108, see FIG. 2.

That is to say the second cam lobe for the inlet valve comes into contact with point 108 and the secondary-rocker arm roller 314 for the inlet valve at the same time that a corresponding point 106 resumes cam lobe contact with the main rocker arm roller 316 for the inlet valve. These two points give virtually the same rocker arm lift and rocker arm speed so that the rolling contact between the first and second cam lobes for the inlet valves and roller 24 will be resumed without impact.

The secondary rocker arm 310 may be coupled to a hydraulic control valve 322 comprising a piston, which is arranged in a hydraulic cylinder in the main rocker arm 308 and which is acted upon by a helical coil spring. The hydraulic piston is a part of a hydraulic circuit, arranged in the main rocker arm 308 and supplied with hydraulic fluid via a feed duct, which is connected to the pressure side of the engine lubricating system. This hydraulic controlling of the secondary rocker arm is well described in SE 52567g and therefore need no further clarification.

The secondary rocker arm may be controlled (on-off operation) by other means than the above mentioned hydraulic way, other means may be electrical, piezo electrical, magnetically, by compressed air or even mechanical. When the secondary rocker arm is in an off position there is a sufficient clearance of said secondary rocker arm roller 314 to the second cam lobe for the inlet valve so that there will be no mechanical contact with the second rocker arm roller 314 to the second cam lobe for the inlet valve. When in on position there is a mechanical contact with said second rocker arm roller 314 and said second cam lobe for the inlet valve.

The secondary inlet rocker arm 310 is according to one embodiment of the present invention extended in the direction of the camshaft. This extension in the direction of the camshaft is for making it possible to actuate the inlet valve directly or via the main rocker arm 308 simultaneously as being capable to interact with the second cam lobe for the inlet valve. Another way of describing it is to say that a part of the secondary rocker arm 310 comprising the secondary inlet rocker arm roller 314 is parallel displaced with respect to the part comprising the control valve 322 by means of a portion 311. The parallel displacement of the secondary inlet rocker arm relates to the laterally spaced apart first and second cam lobes for the inlet valve.

Figure 3B:
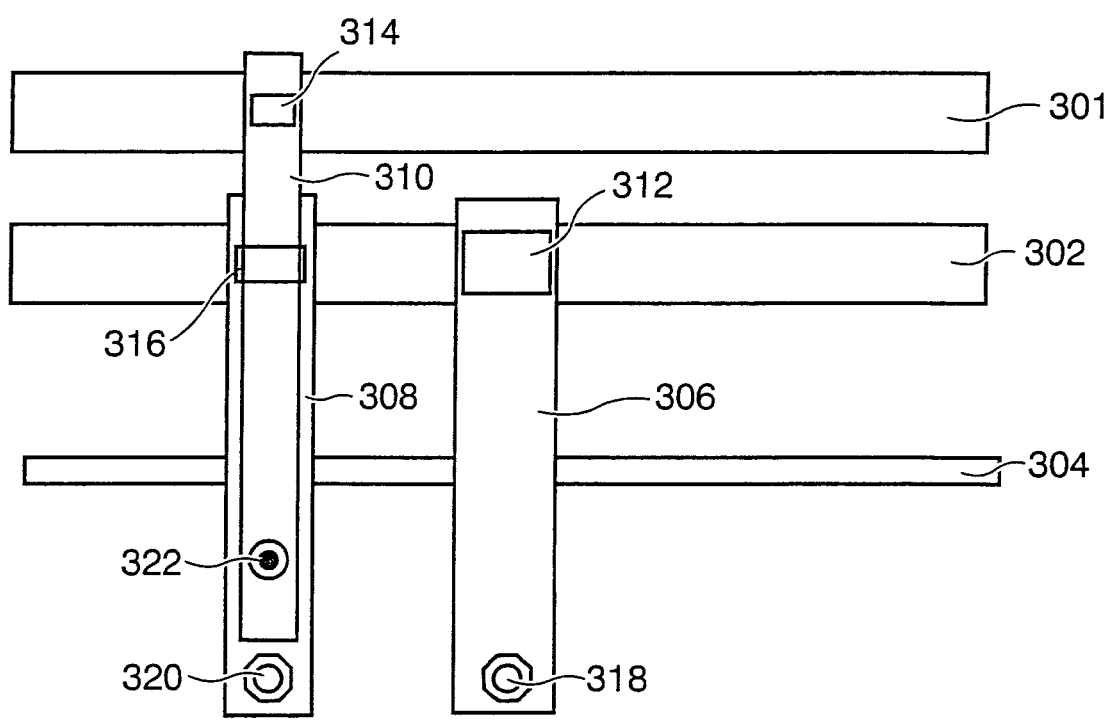
FIG. 3b depicts in view from above a second example embodiment of valve mechanism for accomplishing the present invention

FIG. 3b illustrates schematically another example embodiment of a valve mechanism 300 according to the present invention. Said valve mechanism comprising a first camshaft 302, a second camshaft 301, a rocker arm shaft 304, an outlet rocker arm 306, a main inlet rocker arm 308, and a secondary inlet rocker arm 310. The main inlet rocker arm 308 and the outlet rocker arm 306 are pivotally supported on said rocker arm shaft 304.

The outlet rocker arm 306 is according to the description in relation to FIG. 3a above.

The main inlet rocker arm 308 is on one side of the rocker arm shaft 304 provided with a valve depressor 320, and on the other side a main inlet rocker arm roller 316, which interacts with a first cam lobe for the inlet valve provided on said first rotatable camshaft 302. The main inlet rocker arm 308 is furthermore provided with a secondary inlet rocker arm 310, which may either be pivotally supported on the main rocker arm 308 or pivotally supported by the rocker arm shaft 304.

The secondary inlet rocker arm 310 is on one side of a pivot shaft (being either the rocker arm shaft or a separate shaft which could be arranged in the main rocker arm) provided with a control valve 322, and on the other side a secondary inlet rocker arm roller 314, which is interactable with a second cam lobe for the inlet valve provided on said second rotatable camshaft 301.

The secondary inlet rocker arm 310 may be controlled (on-off operation) by similar means as described above in relation to FIG. 3a.

The secondary inlet rocker arm 310 is according to FIG. 3b extended in a direction perpendicular to the camshaft 301, 302. This extension in the perpendicular direction of the camshaft is for making it possible to actuate the inlet valve directly or via the main rocker arm 308 simultaneously as being capable to interact with the second cam lobe for the inlet valve, because the first and second cam lobes for the inlet valve are arranged on the first and second cam shafts in line with the main and secondary inlet rocker arms 308 and 310 respectively.

Figure 3C:
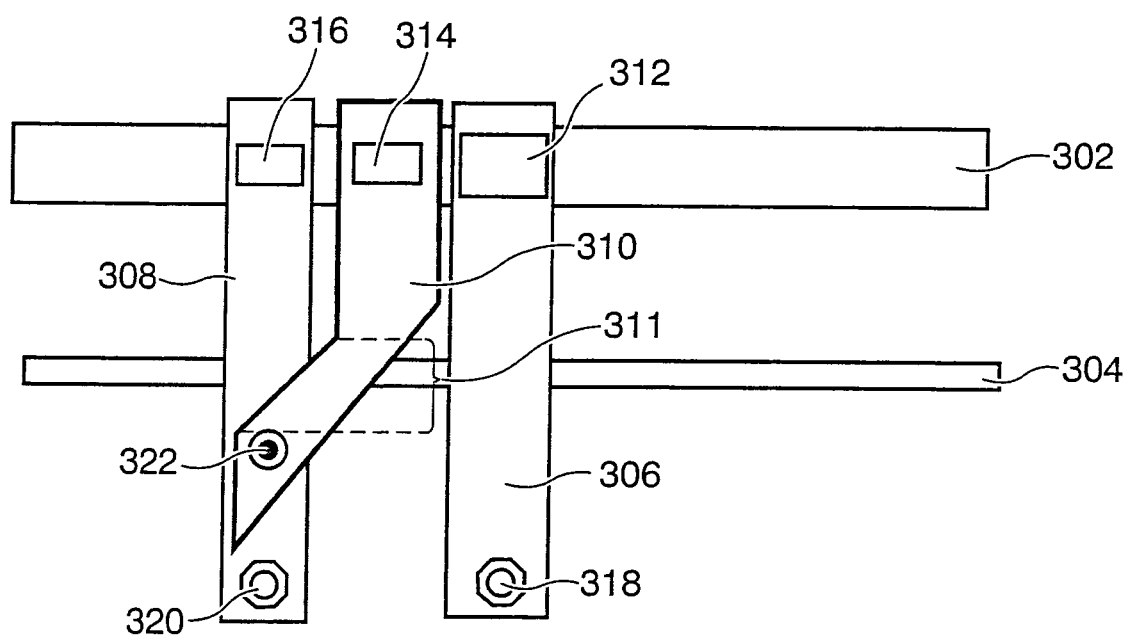
FIG. 3c depicts in view from above a third example embodiment of valve mechanism for accomplishing the present invention

FIG. 3c illustrates an alternative arrangement of the rocker arm shaft 304. In FIG. 3c the rocker arm shaft is arranged in the middle portion of section 311 to reduce wear on rocker arm bearings. This is a different arrangement as depicted in FIG. 3a where said rocker arm shaft is arranged besides said section 310. These two examples illustrates that one may arrange said rocker arm shaft at any position which best suites the available space and wear tolerances.

Figure 4:
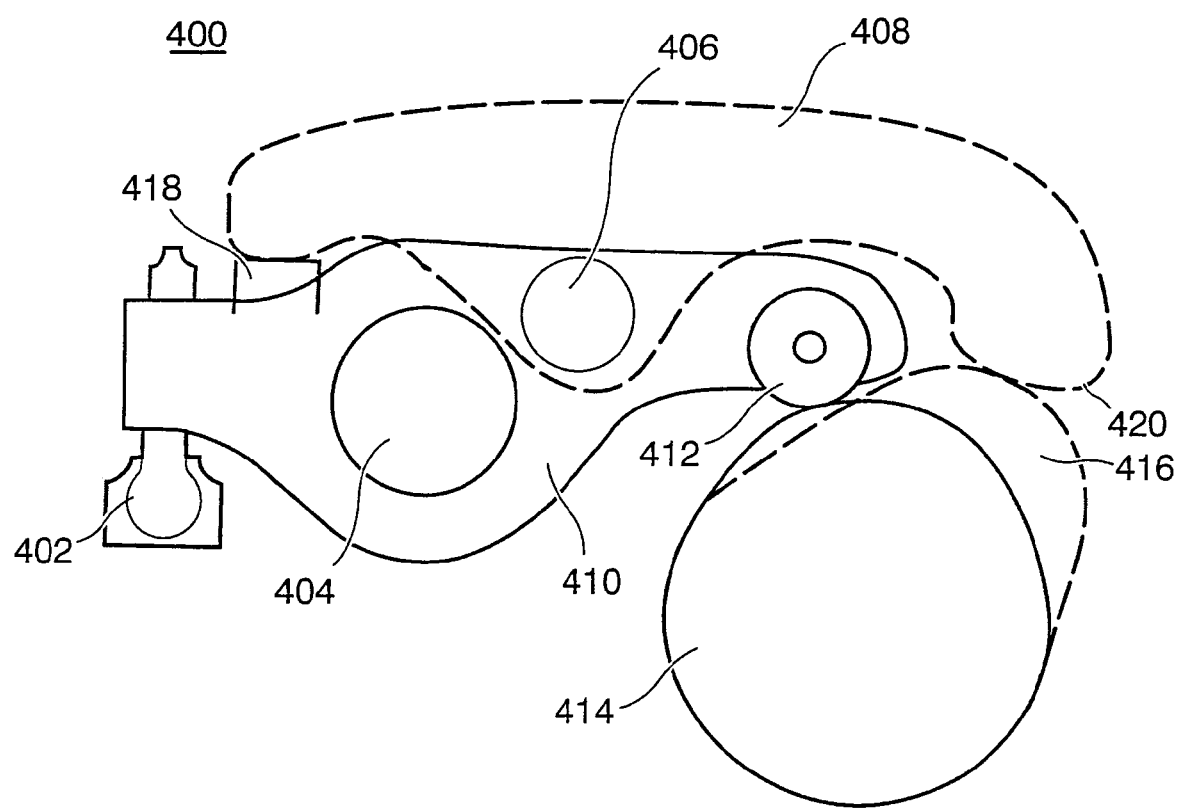
FIG. 4-5 depict in a side view of two example embodiments of the valve mechanism for accomplishing the present invention.

FIG. 4 is a side view of an example embodiment of an inventive valve mechanism 400 according to the present invention. In the figure one can see a first cam lobe for the inlet valve 414, a second cam lobe for the inlet valve 416, a main inlet rocker arm 410, a main rocker arm roller 412, a rocker arm shaft 404, a secondary inlet rocker arm pivot bearing 406, an adjustable valve depressor 402, a control valve 418, a secondary rocker arm 408, and a secondary rocker arm sliding surface 420. The first cam lobe for the inlet valve 414 is laterally separated from the second cam lobe for the inlet valve 416 on a camshaft. The adjustable valve depressor 402 may be directly or indirectly mechanically coupled to the inlet valve. The adjustment is used for setting an appropriate inlet valve clearance. The control valve 418 is used for setting the secondary inlet rocker arm 408 in an on and off position respectively. In the illustrated embodiment in FIG. 4, said secondary inlet rocker arm 408 is pivotally supported by said secondary inlet rocker arm pivot bearing 406 which is provided on said main rocker arm 410. This means that the main inlet rocker arm 410 is pivotally supported by said rocker arm shaft 404 and that said secondary inlet rocker arm 408 is pivotally supported by said secondary inlet rocker arm pivot bearing 406, where said secondary rocker arm shaft is arranged in said main inlet rocker arm 410.

In FIG. 4 it is also illustrated that the connection of a cam lobe (first and/or second cam lobes for the inlet valve) to the rocker arm (main and/or secondary) may be by means of a rocker arm roller or a pure mechanical sliding connection. In FIG. 4 the main rocker arm is illustrated to have a main rocker arm roller 412 connection and that said secondary rocker arm a pure sliding connection to the cam lobe 416 via sliding surface 420. It is of course possible to have the opposite, i.e., a sliding connection for the main rocker arm and a rocker arm roller for the secondary rocker arm. It is also possible to only have sliding connections or rocker arm roller connections.

The positioning of the secondary rocker arm pivot bearing 406 may depend on the design of the secondary rocker arm itself. In an example embodiment said secondary rocker arm pivot bearing may be arranged in the middle of the portion 311, similar to the positioning of the rocker arm shaft positioning as illustrated in FIG. 3c. By arranging the secondary rocker arm pivot bearing 406 in the middle of portion 311 there will be as small bending effects on the secondary rocker arm as possible, resulting in minimal wear on secondary rocker arm pivot bearing.

Figure 5:
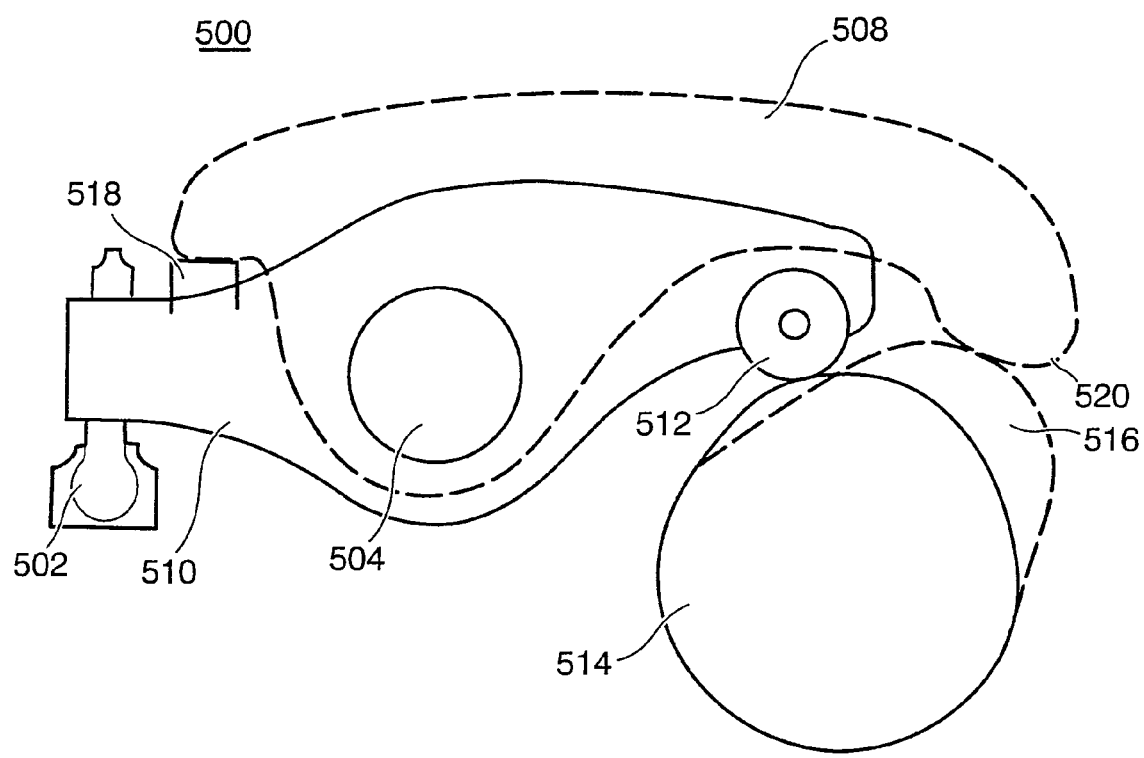

FIG. 5 is a side view of another example embodiment of an inventive valve mechanism according to the present invention. In the figure one can see a first cam lobe for the inlet valve 514, a second cam lobe for the inlet valve 516, a main rocker arm 510, a main rocker arm roller 512, a rocker arm shaft 504, an adjustable valve depressor 502, a control valve 518, a secondary inlet rocker arm 508, and a secondary rocker arm sliding surface 520. The first cam lobe for the inlet valve 514 is laterally separated from the second cam lobe for the inlet valve 516. The adjustable valve depressor may be directly or indirectly mechanically coupled to the inlet valve. The adjustment is used for setting an appropriate valve clearance. The control valve 518 is used for setting the secondary rocker arm 508 in an on and off position respectively. In the illustrated embodiment in FIG. 5, said secondary rocker arm 508 is pivotally supported by the rocker arm shaft 504. This means that the main rocker arm 510 and the secondary rocker arm 508 are pivotally supported by said rocker arm shaft 504.

In FIG. 5 it is also illustrated that the connection of a cam lobe to the rocker arm may be by means of a rocker arm roller or a pure mechanical sliding connection. In FIG. 5 the main rocker arm is illustrated to have a rocker arm roller 512 connection and that said secondary rocker arm a pure sliding connection to the cam lobe 516 via sliding surface 520. It is of course possible to have the opposite, i.e., a sliding connection for the main rocker arm and a rocker arm roller for the secondary rocker arm. It is also possible to only have sliding connections or rocker arm roller connections.

The positioning of the rocker arm shaft 504 may depend on the design of the secondary inlet rocker arm 508 itself. In an example embodiment said rocker arm shaft 504 is arranged in the middle of the portion 311 as illustrated in FIG. 3c. By arranging the rocker arm shaft 504 in the middle of portion 311 there will be as small bending effects on the secondary inlet rocker arm 508 as possible, resulting in minimal wear on rocker arm shaft bearings.

The invention may be applied to any internal combustion engine such as diesel engine, gasoline engine, bifuel/flexifuel engine with one or a plurality of cylinders. The engines may be arranged in vehicles such as cars, trucks, loaders, etc. The engine may also be stationary or arranged in boats.

The invention must not be regarded as being limited to the examples of embodiment described above, a number of further variants and modifications being feasible without departing from the scope of the following claims.

The invention claimed is:

1. A method for reducing turbolag in a turbocharged internal combustion engine comprising an inlet manifold, an exhaust manifold, an exhaust gas recirculation (EGR) line between the exhaust manifold and the inlet manifold and including an EGR valve, and a Variable Geometry Turbine (VGT) turbo unit, comprising the steps of:
    shifting the internal combustion engine from a stationary engine mode to a transient engine mode having a positive pressure difference wherein the positive pressure difference is a condition in which a pressure upstream of an inlet valve of the engine is higher than a pressure downstream of an outlet valve of the engine,
    fully closing the EGR valve at the positive pressure difference during the transient engine mode,
    repositioning guide vanes of the VGT turbo unit from a first position when in the stationary engine mode to a second, more open position at the positive pressure difference during the transient engine mode, and
    increasing an amount of air flowing from the inlet manifold to the exhaust manifold and thereby increasing acceleration of the VGT while the EGR valve is fully closed and the guide vanes of the VGT turbo unit are in the second position by increasing a duration of overlapping of at least one inlet valve and at least one outlet valve provided in a cylinder head of the internal combustion engine from a first duration when in the stationary engine mode to a second duration at the positive pressure difference during the transient engine mode.

2. The method according to claim 1, wherein increasing the duration of overlap of the at least one inlet valve and at least one outlet valve comprises:
    providing a first cam lobe on a rotatable camshaft for interacting with a first main rocker arm serving to transmit the movement of the first cam lobe to a first inlet valve,
    providing at least one second cam lobe spaced apart from the first cam lobe, where the second cam lobe is actable on a secondary rocker arm servable to transmit the movement of the second cam lobe to the first inlet valve during each revolution of the camshaft, and switching the secondary rocker arm between at least two different working positions, the method further comprising switching the secondary rocker arm between at least two different positions with a hydraulic circuit comprising a fluid source, a hydraulic piston, which is displaceable in a hydraulic cylinder.

3. The method as claimed in claim 1, wherein increasing the duration of overlap of the at least one inlet valve and at least one outlet valve comprises:

providing a first cam lobe on a rotatable camshaft for interacting with a first main rocker arm serving to transmit the movement of the first cam lobe to a first inlet valve, providing at least one second cam lobe spaced apart from the first cam lobe, where the second cam lobe is actable on a secondary rocker arm servable to transmit the movement of the second cam lobe to the first inlet valve during each revolution of the camshaft, and switching the secondary rocker arm between at least two different working positions, the method further comprising switching the secondary rocker arm between at least two different positions with an electromagnetic circuit comprising an electromagnetic source and a piston displaceable in a cylinder, where the piston is movable by means of applying an electromagnetic field.

4. The method as claimed in claim 1, wherein increasing the duration of overlap of the at least one inlet valve and at least one outlet valve comprises:

providing a first cam lobe on a rotatable camshaft for interacting with a first main rocker arm serving to transmit the movement of the first cam lobe to a first inlet valve, providing at least one second cam lobe spaced apart from the first cam lobe, where the second cam lobe is actable on a secondary rocker arm servable to transmit the movement of the second cam lobe to the first inlet valve during each revolution of the camshaft, and switching the secondary rocker arm between at least two different working positions, the method further comprising switching the secondary rocker arm between at least two different positions with an air pressure circuit comprising an air pressure source and a piston displaceable in a cylinder, where the piston is movable by means of applying an air pressure.

5. A computer readable memory comprising a program code for performing the method as claimed in claim 1.

6. A vehicle comprising the computer readable memory as claimed in claim 5.

7. An apparatus for reducing turbolag in a turbocharged internal combustion engine comprising an inlet manifold, an exhaust manifold, an exhaust gas recirculation (EGR) line between the exhaust manifold and the inlet manifold and including an EGR valve, and a Variable Geometry Turbine (VGT) turbo unit, the apparatus further comprising:

means for demanding torque for shifting the internal combustion engine from a stationary engine mode to a transient engine mode having a positive pressure difference wherein the positive pressure difference is a condition in which a pressure upstream of an inlet valve of the engine is higher than a pressure downstream of an outlet valve of the engine, means arranged for fully closing the EGR valve at the positive pressure difference during the transient engine mode when torque is demanded, means arranged for repositioning guide vanes of the VGT turbo unit from a first position when in the stationary engine mode to a second, more open position at the positive pressure difference during the transient engine mode, and means arranged for increasing a duration of overlapping of at least one inlet valve and at least one outlet valve provided in a cylinder head of the internal combustion engine from a first duration when in the stationary engine mode to a second duration at the positive pressure difference during the transient engine mode while the EGR valve is fully closed and the guide vanes of the VGT turbo unit are in the second position for increasing an amount of air flowing from the inlet manifold to the exhaust manifold and thereby increasing acceleration of a turbine of the VGT turbo unit.

8. The apparatus according to claim 7, wherein the means for increasing of duration of at least one inlet valve and at least one outlet valve comprising:

a first cam lobe on a rotatable camshaft for interacting with a first main rocker arm serving to transmit the movement of the first cam lobe to a first inlet valve, at least one second cam lobe spaced apart from the first cam lobe, where the second cam lobe is actable on a secondary rocker arm servable to transmit the movement of the second cam lobe to the first inlet valve during each revolution of the camshaft, means for switching the secondary rocker arm between at least two different working positions.

9. The apparatus according to claim 8, wherein the at least second cam lobe is provided laterally spaced apart from the first cam lobe on the rotatable camshaft.

10. The apparatus according to claim 8, wherein the second cam lobe is provided on a second camshaft and the first cam lobe is provided on a first camshaft.

11. The apparatus according to claim 8, wherein the means for switching the secondary rocker arm between at least two different positions is one of the group of a hydraulic circuit comprising, a fluid source, a hydraulic piston, which is displaceable in a hydraulic cylinder; an electromagnetic circuit comprising an electromagnetic source and a piston displaceable in a cylinder, where the piston is movable by means of applying an electromagnetic field; an air pressure circuit comprising an air pressure source and a piston displaceable in a cylinder, where the piston is movable by means of applying an air pressure.

* * * * *